(12) United States Patent
Ragot

(10) Patent No.: US 8,210,041 B2
(45) Date of Patent: Jul. 3, 2012

(54) DRIFT-COMPENSATED INERTIAL ROTATION SENSOR

(75) Inventor: Vincent Ragot, Paris (FR)

(73) Assignee: Sagem Defense Securite, Paris (FR)

( * ) Notice: Subject to any disclaimer, the term of this patent is extended or adjusted under 35 U.S.C. 154(b) by 0 days.

(21) Appl. No.: 12/996,705

(22) PCT Filed: Jun. 12, 2009

(86) PCT No.: PCT/FR2009/000700
§ 371 (c)(1),
(2), (4) Date: Dec. 7, 2010

(87) PCT Pub. No.: WO2009/150332
PCT Pub. Date: Dec. 17, 2009

(65) Prior Publication Data
US 2011/0083508 A1      Apr. 14, 2011

(30) Foreign Application Priority Data
Jun. 13, 2008   (FR) ..................... 08 03302

(51) Int. Cl.
*G01C 19/56* (2006.01)
*G01P 9/04* (2006.01)

(52) U.S. Cl. .................... 73/504.12; 73/510; 73/504.04; 73/504.13

(58) Field of Classification Search ................. 73/504.12
See application file for complete search history.

(56) References Cited

U.S. PATENT DOCUMENTS

| | | | |
|---|---|---|---|
| 3,656,354 A | 4/1972 | Lynch | |
| 4,752,949 A * | 6/1988 | Steinbeck et al. | 455/74.1 |
| 4,951,508 A * | 8/1990 | Loper et al. | 73/504.13 |
| 5,587,529 A * | 12/1996 | Iguchi et al. | 73/504.13 |
| 5,763,780 A * | 6/1998 | Matthews et al. | 73/504.13 |
| 5,817,940 A | 10/1998 | Kobayashi | |
| 5,892,152 A * | 4/1999 | Darling et al. | 73/504.13 |
| 5,915,276 A * | 6/1999 | Fell | 73/504.13 |
| 6,065,340 A * | 5/2000 | Matthews et al. | 73/504.13 |
| 6,189,382 B1 * | 2/2001 | Johnson | 73/504.13 |
| 6,467,346 B1 | 10/2002 | Challoner | |
| 6,927,568 B2 * | 8/2005 | Nozoe et al. | 324/207.25 |
| 7,010,977 B2 * | 3/2006 | Renault | 73/504.13 |
| 7,093,488 B2 * | 8/2006 | Ragot et al. | 73/510 |
| 2003/0006783 A1 | 1/2003 | Min | |
| 2006/0096375 A1 * | 5/2006 | Renault | 73/504.12 |
| 2006/0096376 A1 * | 5/2006 | Renault | 73/504.12 |

FOREIGN PATENT DOCUMENTS

EP     1 541 967 A     6/2005

* cited by examiner

*Primary Examiner* — Hezron E Williams
*Assistant Examiner* — Gregory J Redmann
(74) *Attorney, Agent, or Firm* — Muncy, Geissler, Olds & Lowe, PLLC

(57) ABSTRACT

An inertial rotation sensor including a vibrating member having facing metal-plated portions forming a variable capacitance capacitor associated with a low impedance load circuit via a multiplexer/demultiplexer member.

2 Claims, 1 Drawing Sheet

DRIFT-COMPENSATED INERTIAL ROTATION SENSOR

The invention relates to an inertial rotation sensor with drift compensation.

BACKGROUND OF THE INVENTION

It is known that an isotropic vibrating gyro is constituted by an axially symmetrical resonator having two degrees of freedom.

The position of its vibration is identified by two electrostatic detectors, each constituted by a group of electrodes secured to the housing.

Controls for controlling the vibration are applied by two electrostatic drivers, each constituted by a group of electrodes secured to the housing.

Control of the vibration consists in compensating for damping, canceling frequency anisotropy, and possibly also modifying the orientation and/or the frequency of vibration.

In free gyro mode, the position of the vibration relative to the housing is determined in part by the angular velocity applied to the appliance. In this mode of operation, drift, i.e. the apparent rotation that results from imperfections of the appliance, depends on the position of the vibration relative to the housing.

In the frame of reference formed by the two detectors, the vibration may be characterized by its polar coordinates.

The polar angle $\theta$ is defined modulo $\pi$, and as a result the drift of the gyro is a periodic function of $\theta$ with period $\pi$.

The drift of the gyro may then be set out in the form of a Fourier series made up of terms in $\cos(2n\theta)$ and $\sin(2n\theta)$, where n designates the set of integers.

The main cause of mean drift (the constant term in the Fourier series) is the indexing of the detector reference points and the driver reference points.

Using the same electrodes both as drivers and as detectors serves, to a first approximation, to eliminate mean drift.

For the process to be effective, it is necessary that the mathematical expression for the detector gains and for the driver gains to be similar so that defects in the implementation of the detectors are compensated naturally by the drivers.

In known devices, the detection signal is measured by associating each detection electrode with a high impedance load circuit, i.e. with a circuit having input impedance that is very high compared with the output impedance of the corresponding detection electrode. Under such circumstances, the current delivered by the detection electrode is close to zero and the voltage picked up at the terminals of the load circuit is theoretically a linear function of the modulation of the airgap. Unfortunately, parasitic impedances resulting from defects in the fabrication of the rotation sensor degrade the linearity of the response of the sensor. In order to minimize this effect, the detection signals are generally conveyed by active shielding, which is very expensive and very bulky. Furthermore, the modulation of the electric field in the airgap gives rise to electrical losses due to impurities, thereby contributing to damping vibration in a manner that varies as a function of the orientation of the vibration, and thus to giving rise to drift that is itself a function of the orientation of the vibration relative to the housing.

OBJECT OF THE INVENTION

An object of the invention is to cause the portion of drift to be independent of the position of the vibration relative to the housing of the appliance.

SUMMARY OF THE INVENTION

In order to achieve this object, the invention proposes an inertial rotation sensor having a vibration member with facing metal-plated portions forming a variable capacitance capacitor associated with a low impedance load circuit via a multiplexer/demultiplexer member. The multiplexer system makes it possible to use the electrodes in alternating time periods as actuators and as detectors. This combination of a multiplexer/demultiplexer member with a low impedance load circuit serves to compensate drift, thereby automatically eliminating the drift term that is independent of the position of the vibration relative to the housing of the appliance.

BRIEF DESCRIPTION OF THE DRAWING

Other characteristics and advantages of the invention appear on reading the following description of two particular embodiments of the inertia rotation sensor of the invention relative to the accompanying drawing, in which:

With reference to FIG. 1, the vibrating sensor shown comprises in conventional manner a cap of silica material 1 carried by a stem 4 fastened to a base 3. The inside surface of the cap 1 together with the edge thereof and also the stem 4 are covered in a stem of metal 2. The base 3 carries electrodes 5. Each electrode 5 co-operates with the facing metal-plated edge of the cap 1 to form a variable-capacitance capacitor 6 that operates alternately in control and in detection by means of a processing system 16.

With reference to FIG. 2, numerical references that are identical to those used in FIG. 1 have been used in order to designate components having an identical function. Processing system, 16 includes a multiplexer/demultiplexer 7, a load circuit 9 and a processing unit 10 connected serially. The load circuit has two branches.

In FIG. 2, one branch of the load circuit 9 has an amplifier 12 having an inverting input connected to one of the terminals of the capacitor 6. A resistor 11 is looped between the output of the amplifier 11 and its inverting input. The non-inverting input of the amplifier 12 is connected to ground, and an output terminal is connected to the processing unit 10.

Figure 2:
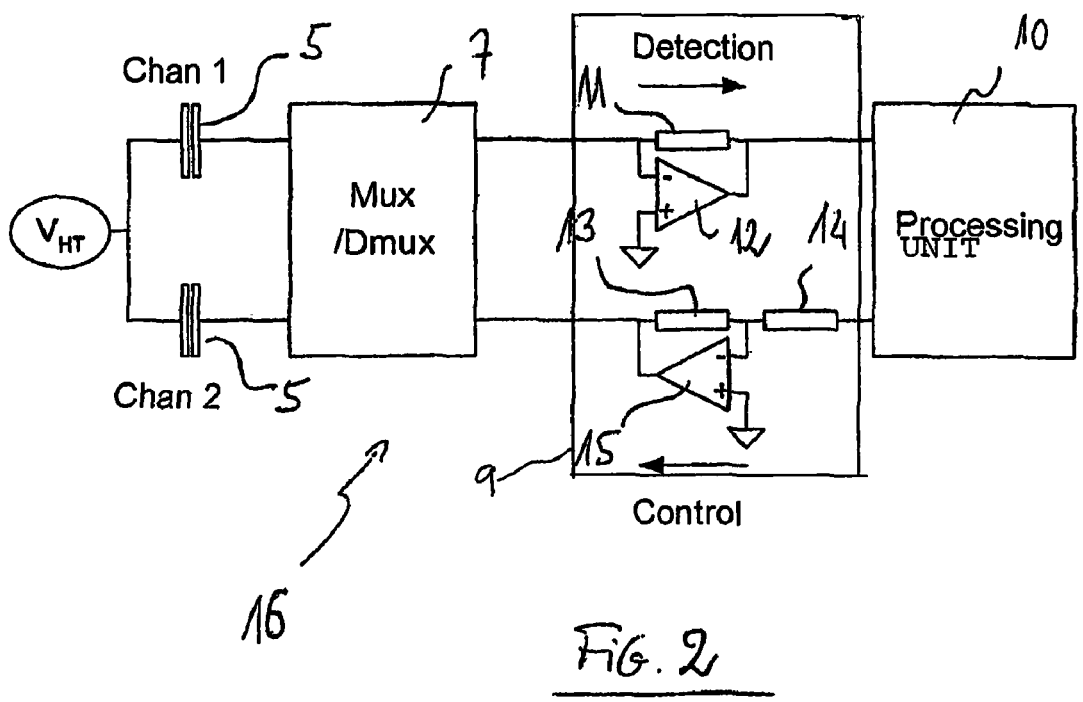
FIG. 2 is a diagram of the processing system of FIG. 1.
Figure 1:
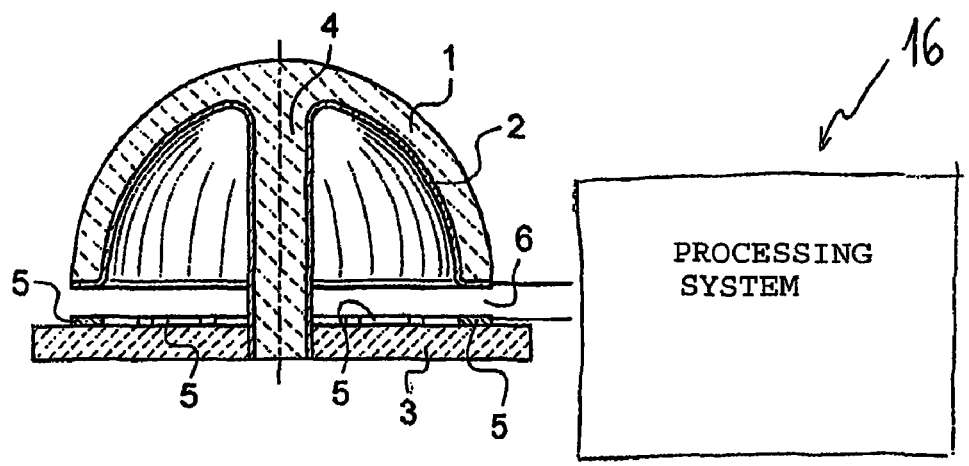
FIG. 1 is a diagrammatic section view of a hemispherical vibrating resonator sensor and of the processing system associated therewith in the invention.

According to the invention, each branch of the load circuit 9 is a low impedance circuit, i.e. it satisfies the relationship:

$$R/G \ll 1/(C\omega_0)$$

where R is the resistance of the resistor 11 or 13, G is the gain of the amplifier 12 or 15, C is the capacitance of the variable capacitor 6, and $\omega_0$ is the angular frequency of the vibration at the resonant frequency of the sensor.

In a second branch of load circuit 9, an amplifier 15 has its output connected to its inverting input by a short-circuit line, including resistor 13, while its non-inverting input is connected to ground. The output is also connected to multiplexer/demultiplexer 7. A resistor 13 has one end connected to multiplexer/demultiplexer 7 and another end connected to the processor unit 10 through resistor 14. In order to make a low-impedance load circuit, the resistor 13 satisfies the relationship:

$$R \ll 1/C\omega_0$$

Naturally, the invention is not limited to the embodiments shown and may be subjected to embodiment variants that may appear to the person skilled in the art without going beyond the ambit of the invention as defined by the claim.

In particular, although the invention is described with reference to an inertial rotation sensor having a vibrating cap, the invention also applies to any rotation sensor including facing electrodes arranged to constitute a variable-capacitance capacitor acting in alternation as an actuator and as a detector.

Although two examples of the load circuit are given, the invention also applies to any device using a low impedance load circuit, i.e. a circuit having input impedance that is very small compared with the output impedance of the variable capacitor.

The invention claimed is:

1. An inertial rotation sensor, comprising:
   a vibrating member having facing metal-plated portions forming a variable capacitance capacitor;
   a multiplexer/demultiplexer member connected to said variable capacitance capacitor; and
   a load circuit connected to said multiplexor/demultiplexer member, wherein the load circuit is a low impedance load circuit.

2. An inertial rotation sensor according to claim 1, wherein the load circuit comprises:
   an amplifier with a gain G; and
   a looping resistance R,
   such that $R/G \ll 1/(C\omega_0)$,
   where C is the capacitance of the capacitor and $\omega_0$ is an angular frequency of the vibrating member vibrating at a resonance frequency of the sensor.

* * * * *